United States Patent [19]
Demotte et al.

[11] Patent Number: 5,737,218
[45] Date of Patent: Apr. 7, 1998

[54] SYSTEM WITH GRAPHICAL INTERFACE FOR MODIFYING POSITION OF PROGRAMMABLE FIXTURE DEVICES

[75] Inventors: Donald D. Demotte, Lake Orion; James B. Kosmala, Clarkston, both of Mich.

[73] Assignee: Fanuc Robotics North America, Inc., Auburn Hills, Mich.

[21] Appl. No.: 551,675

[22] Filed: Nov. 1, 1995

[51] Int. Cl.⁶ .................................................. G05B 19/00
[52] U.S. Cl. ............................ 364/191; 364/188; 364/192
[58] Field of Search .............................. 29/430, 466, 712, 29/714; 318/569, 574; 364/188, 191, 192, 468.02, 474.15, 474.35; 395/88

[56] References Cited

U.S. PATENT DOCUMENTS

| | | | |
|---|---|---|---|
| 3,357,091 | 12/1967 | Reissmueller et al. | 29/714 X |
| 3,624,886 | 12/1971 | Powers et al. | 29/824 |
| 4,561,176 | 12/1985 | Leddet | 29/709 |
| 4,589,184 | 5/1986 | Asano et al. | 29/430 |
| 4,589,199 | 5/1986 | Ohtaki et al. | 29/714 |
| 4,654,949 | 4/1987 | Pryor | 29/407 |
| 4,691,905 | 9/1987 | Tamura et al. | 269/45 |
| 4,736,515 | 4/1988 | Catena | 29/714 |
| 4,738,387 | 4/1988 | Jaufmann et al. | 228/4.1 |
| 4,757,608 | 7/1988 | Ochi | 29/787 |
| 4,811,891 | 3/1989 | Yamaoka et al. | 228/182 |
| 4,821,408 | 4/1989 | Speller, Sr. et al. | 29/701 |
| 4,852,237 | 8/1989 | Tradt et al. | 29/407 |
| 4,875,273 | 10/1989 | Yamamoto | 29/467 |
| 4,876,786 | 10/1989 | Yamamoto et al. | 29/429 |
| 4,894,901 | 1/1990 | Soderberg | 29/428 |
| 4,944,445 | 7/1990 | Zimmer | 228/102 |
| 4,960,969 | 10/1990 | Shigenaka | 219/91.2 |
| 5,005,277 | 4/1991 | Uemura et al. | 29/407 |
| 5,125,149 | 6/1992 | Inaba et al. | 29/430 |
| 5,141,357 | 8/1992 | Sherman et al. | 703/408.1 |
| 5,161,101 | 11/1992 | Nishiyama et al. | 364/191 |
| 5,210,478 | 5/1993 | Sasaki et al. | 364/474.35 X |
| 5,239,739 | 8/1993 | Akeel et al. | 29/430 |

*Primary Examiner*—Edward R. Cosimano
*Attorney, Agent, or Firm*—Howard & Howard

[57] ABSTRACT

An apparatus for interfacing between a human operator and a manufacturing cell having a plurality of mechanical units for assembling components and subassemblies includes a video monitor responsive to display signals for generating to the human operator a graphic display of information related to a selected one of a plurality of mechanical units in the manufacturing cell. An input device such as a mouse is responsive to the human operator for generating command signals representing desired changes to the graphic display including information as to which of the mechanical units is selected, which style of components is selected and an amount and direction of a software shim to be applied to the selected mechanical unit. A data processing means is connected to the video monitor and to the input device, is responsive to the command signals for generating control signals and is responsive to position signals for generating the display signals. The data processing means is connected to the manufacturing cell for receiving the position signals generated by the selected mechanical unit representing a predetermined master position of the selected mechanical unit and the mechanical unit is responsive to the control signals for repositioning to a new desired position represented by the command signals.

12 Claims, 7 Drawing Sheets

SYSTEM WITH GRAPHICAL INTERFACE FOR MODIFYING POSITION OF PROGRAMMABLE FIXTURE DEVICES

BACKGROUND OF THE INVENTION

The present invention relates generally to programmable fixture devices for assembling components into an assembly and, in particular, to an apparatus and a method for graphically interfacing between an operator and such programmable fixture devices.

The process of constructing a vehicle body includes forming subassemblies from individual body panel components, forming larger subassemblies from groups of smaller subassemblies, panels and other components, and forming a final body assembly from the larger subassemblies. During the construction process, the components and subassemblies must be held in fixed, predetermined positions while attachment operations such as welding and inserting fasteners are performed. Typically, the components and subassemblies are held at a work or assembly station in fixtures utilizing locators and clamps which are movable to abut predetermined points on a component surface during the attachment operation and to retract from the surface to permit the subassembly to be moved to another assembly station. Since components are manufactured within a tolerance range, the locations of the predetermined points will vary from component to component and from subassembly to subassembly. The fixtures must also be capable of adjustments in holding positions to accommodate the various locations of the predetermined points.

One method of adjusting the fixtures is to utilize relatively thin pieces of metal known as "shims" to move the engaging surface of the fixture from the nominal location of the predetermined point to the actual location of the predetermined point on the surface of the component. The selection of the shim or shims to be used is made by an operator who either measures or visually observes a completed assembly to determine the necessary adjustment. The insertion and removal of the shims is a time consuming and costly process since production must be stopped each time to physically insert or remove a shim.

In order to avoid the problems associated with the physical insertion and removal of shims, some assembly systems utilize robots to make the necessary adjustments. The U.S. Pat. No. 5,005,277 shows a system including robots which are automatically adjusted to move and secure work pieces to a basic body member. At each stage along a production line, robots are provided having supporting jigs, gauge devices and work clamp devices to correctly position and hold body panels which are then welded in place on a frame. One or more inspection stages include a plurality of dimension measuring devices for ascertaining whether the attached panels have been located in the correct positions. The robots and the dimension measuring devices are connected to a central control having an expert system. The central control includes a CPU, a memory, a CAD data memory, a body assembly database, and an inference engine. When the assembly operation is started, CAD data is loaded into the CAD memory. The CPU then utilizes the stored CAD data to derive the initial displacement of the jigs from their home positions and the displacement by which each of the plates of the gauge devices must be displayed from their respective home positions. Next, the reference point or points which are to be used as scanning targets are derived from the CAD data. Upon receiving the position information from the measuring devices, the CPU calculates reference point deviation, converts the reference point deviation to gauge deviation, and calculates the gauge device deviation correction amount necessary to correct the gauge deviation during production using the information in the body assembly database. The inference engine is utilized to determine the amounts by which each of the plates in the gauges are to be moved, and the displacements for the work support jigs and gauge devices are changed accordingly.

The U.S. Pat. No. 5,239,739 shows a method and system for the flexible assembly of components into an assembly at an assembly station within an assembly area in an adaptive, programmable fashion. Several programmable locators mounted on a platform work cooperatively to receive and support components or parts having critical positioning features at approximate locations. The programmable locators then move the components so that the critical positioning features and hence the components are at desired locations. Thereafter, part position and orientation are constrained at retaining locations while the components are in their desired locations. Processing equipment at least partially joins the retained components either at the assembly station or at a separate processing station. One of the programmable locators may provide one of the retaining locations. Preferably, at least one sensor mounted on one of the programmable locators provides at least one feedback signal for a control means which controls at least one programmable locator to adapt its position with respect to at least one critical feature of its part to thereby relocate the part. In this way, verification of the accuracy of the positioning and holding is provided.

The above described devices have several shortcomings. The accuracy of the new position is very dependent upon the skill of the operator. The operator must be trained in robotic motion, teach pendant operation, coordinate systems, programmable controller program creation and editing, 3-D print reading, part tolerencing and body shop terminology. Changes are made in robot or tool coordinates, not body frame coordinates and the operator may be required to transform the desired position changes from one coordinate system to another. When dimension inspection such as machine vision is utilized, special lighting is required and the cycle time is increased. Also, machine vision changes a reference frame but does not change the master position for the part.

SUMMARY OF THE INVENTION

The present invention concerns a graphical user interface (GUI) between an operator and a programmable fixture system for processing components into an assembly. An interface means includes an input device (keyboard, mouse) and an output device (video monitor) which are connected to a central processing unit (CPU), a memory and a manufacturing cell including several mechanical units which are utilized to locate, clamp or process components while such components are being made into a subassembly. The operator uses the interface device to select a style representing one of several assemblies to be manufactured. The position information related to the components and the clamping sequence information for each assembly is stored in the memory as a master position and is utilized by the CPU to control the position and operation of the mechanical units. Both the stored position information and the location of the mechanical units are referenced from a common reference point which is the same reference point that it is utilized for the manufacturing drawings for the assembly (body frame coordinate system).

The position of any mechanical unit in the manufacturing cell can be adjusted by the operator who utilizes the interface means to input "software shim" information representing a currently taught position. The CPU responds to the "software shim" information by moving the appropriate mechanical unit in the direction and the amount of distance specified by the operator and also stores the "software shim" information in association with the original position information for the assembly. Thus there is a record of each "software shim".

The output device is responsive to display signals for generating to the human operator a graphic display of information related to a selected programmable fixture (mechanical unit). The input device is responsive to the human operator for generating command signals representing desired changes to the graphic display of information. The graphic display can be a shim utility screen including a manufacturing cell display area having a graphical representation of a position of the programmable fixture relative to a common reference point. The shim utility screen can include a shim size display area having a visual indication of a size of a software shim to be applied to the programmable fixture and a visual indication of a direction in which the software shim is to be applied to the programmable fixture. The shim utility screen also can include a function selected display area having a visual indication of a function selected, a mechanical unit selected and a style selected for the programmable fixture, a message display area having a visual indication of operating messages and error messages and a shim history display area having a visual indication of software shims previously applied to the programmable fixture.

The graphic display can be a position edit utility screen including a position display area having a visual indication of the master position and of the currently taught position of the programmable fixture relative to the common reference point. The graphic display can be a frame edit utility screen including a style frame edit display area having a visual indication of information representing a style selected for the programmable fixture. The graphic display also can be a monitor utility screen including a CPU display area having a visual indication of information representing a status of said data processing means and a CTLR display area having a visual indication of information representing a status of the programmable fixture.

The invention has the advantage of eliminating the need for converting from drawing coordinates to manufacturing cell coordinates and for jogging a tool to a new position.

The invention has the further advantage of eliminating the need for physically inserting and removing mechanical shims.

The present invention overcomes the shortcomings of the prior art systems by placing both the value and the orientation of a change under the control of the operator. The system according to the present invention will lead and direct the operator through a predetermined series of steps with guidance as to the required information to be entered. All changes to the positions of the programmable fixtures are made in body frame or part specific coordinates. Unlike robots, only a final position is important, not a path of movement to the final position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

In the assembly of components and/or subassemblies into subassemblies and/or final assemblies, it is extremely important to rigidly hold the parts to be joined in an accurate position while a manufacturing operation is performed. Typically, a programmable fixture for locating or clamping a part is positioned according to master position information entered into a programmable controller (CTLR) connected to control an actuator or robot arm. If a change is to be made from the master position, the operator must "jog" to a new position based upon his perception or machine vision inspection must be used to automatically initiate a change in the reference frame. If the operator selects the new position, the master position information in the CTLR must be changed either by program editing or an operator initiated teach pendant. The present invention provides a method and apparatus for generating "software shims" which eliminate any jogging or program editing in order to achieve a more accurate final position while retaining position information for the master position and any intermediate moves to permit each shim to be undone.

Figure 1:
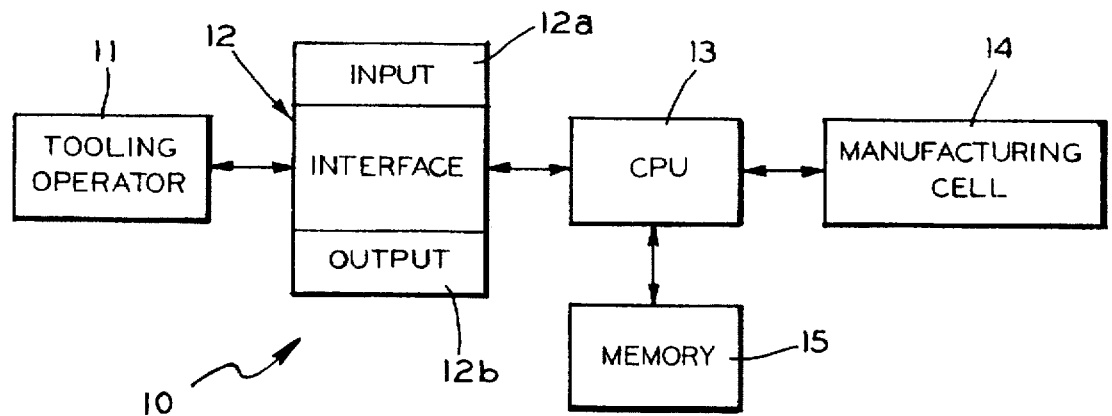
FIG. 1 is a schematic block diagram of a programmable fixture manufacturing system including a graphical interface in accordance with the present invention.

There is shown in the FIG. 1 a programmable fixture manufacturing system 10 having a graphical interface in accordance with the present invention. A human being identified as a tooling operator 11 observes information displayed by and inputs command information into an interface means or device 12. The interface device 12 includes at least one input means and at least one output means. For example, the interface 12 can include an input means 12a such as a keyboard, a mouse or a light pen for inputting operator commands and an output means 12b such as a video monitor for displaying information to the operator. The interface device 12 is connected to a data processing means such as a central processing unit (CPU) 13 which receives command signals from the interface device representing command information inputted by the operator 11. The CPU 13 also generates display signals to the interface device 12 representing information to be displayed to the operator 11. The CPU 13 is connected to a manufacturing cell 14 which will be described in more detail below. The manufacturing cell 14 includes one or more programmable fixtures (see FIG. 2) for maintaining one or more components in a predetermined fixed position while one or more manufacturing operations are performed. The CPU 13 is also connected to a memory 15 which stores an operating program for reading the command signals generated by the interface 12, generating the display signals to the interface, generating control signals to the manufacturing cell 14 and reading position signals generated by the manufacturing cell 14. The memory 15 also includes information related to the predetermined position of the component or components relative to a common reference point as described below.

Figure 2:
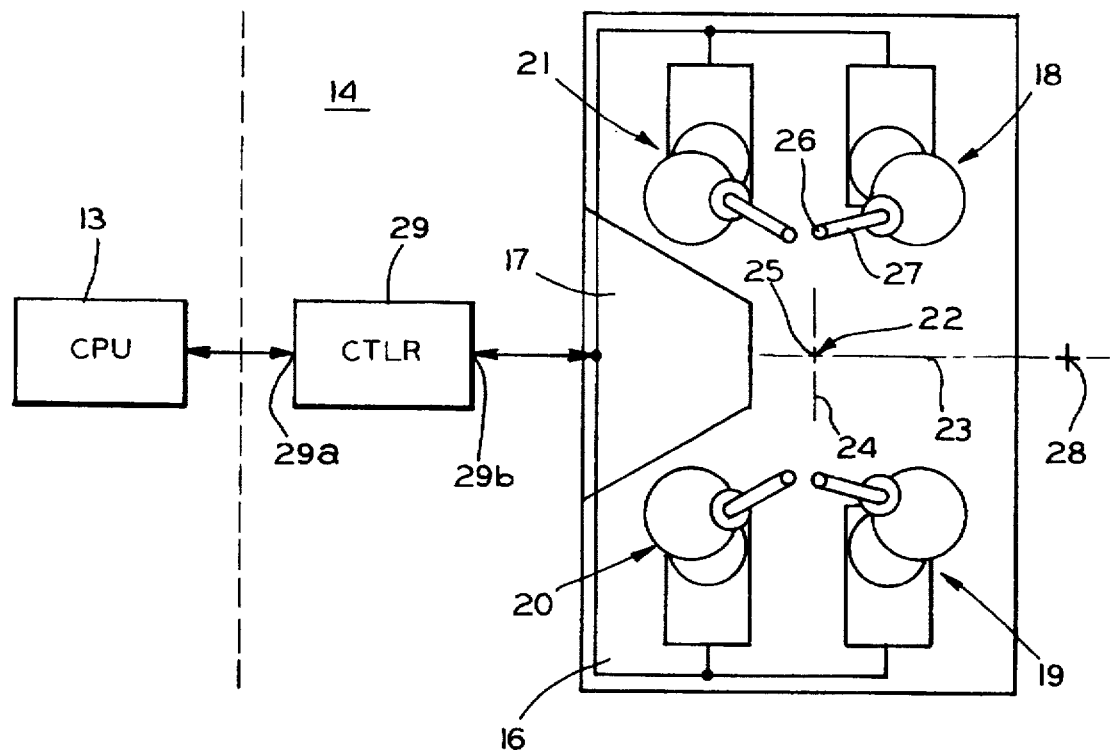
FIG. 2 is schematic plan view of the manufacturing cell shown in the FIG. 1.

There is shown in the FIG. 2 a schematic plan view of the manufacturing cell 14. The manufacturing cell 14 includes a subplate 16 which typically is mounted on a floor (not shown) of a manufacturing plant. The subplate 16 includes a tooling operator loading area 17 from which the operator 11 loads components and/or subassemblies into the manufacturing cell 14 and unloads subassemblies or final assemblies from the manufacturing cell. The loading and unloading can be performed manually or automatically. Mounted on the subplate 16 are a plurality of mechanical units which are utilized to maintain the components or subassemblies in position for the manufacturing operations to be performed. For example, viewing the subplate 16 from the perspective from an operator standing in the operator loading area 17, a first mechanical unit 18 is mounted on the subplate 16 in a far left corner, a second mechanical unit 19 is mounted in a far right corner, a third mechanical unit 20 is mounted in a near right corner and a fourth mechanical unit 21 is mounted in a near left corner. Typically, each mechanical unit includes an electric servo controlled small 4-axis robotic arm movable along an X axis, a Y axis a Z axis and a roll axis. However, the mechanical units are not limited to such construction, but can be any electric servo controlled mechanism. Position feedback can be by conventional means such as monitoring the force generated by the motors or measuring the components. The mechanical units 18 through 21 can be programmable locators of the type described in more detail in the U.S. Pat. No. 5,239,739 incorporated herein by reference.

The subplate 16 also includes within its boundaries a common reference point 22 which is utilized to determine the positioning of an articulated arm on each of the mechanical units 18 through 21. The common reference point 22 is defined as the origin of three orthogonal axes. An X axis 23 extends generally horizontally through the point 22 with positive values to the left of the point 22 and negative values to the right of the point 22. A Y axis 24 extends generally vertically through the point 22 with positive values below the point 22 and negative values above the point 22. A Z axis 25 extends through the point 22 perpendicular to the X axis 23 and the Y axis 24 with positive values extending away from the subplate 16 toward the viewer and negative values extending toward the subplate away from the viewer. A contact point on each of the mechanical units with the components to be assembled is also referenced to the common reference point 22. For example, a contact point 26 on an articulated arm 27 of the first mechanical unit 18 can have its position related to the common reference point 22 utilizing the Cartesian coordinate system. Each of the mechanical units 19 through 21 also can be referenced to the common reference point 22 in a similar manner.

The manufacturing drawings for the components of the body of a vehicle typically are dimensioned from a style origin reference point for the body. In order to produce the most dimensionally accurate assembly of the body components, it is desirable to utilize the style origin point as a reference for positioning the mechanical units 18 through 21. Typically, a style origin point 28 is located along the X axis 23 at the zero position for the Y axis 24. The style origin point can be any defined position, the alignment of axes is a common choice, but is not required. Now, the position of each of the mechanical unit contact points can be determined with respect to the style origin point 28 when assembling the body components. Of course the location of the style origin point 28 will vary according to the body style being manufactured at the time. Thus, the information related to the positioning of various style reference points can be stored in the memory 15 and read by the CPU 13 when the body style being manufactured is identified by the operator 11 through the interface 12.

The mechanical units 18 through 21 are typically operated by a programmable controller (CTLR) which stores a logic program with information for generating control signals to the servo motors. The manufacturing cell 14 includes a CTLR 29 having a first input/output 29a connected to the CPU 13 and a second input/output 29b connected to each of the mechanical units 18 through 21. When the operator 11 desires to make a change in the positioning of any of the mechanical units 18 through 21, the CPU 13 downloads all of the style, arm and positional information from the CTLR 29. This is done to ensure that a "master" copy of the data is maintained on the CTLR 29. The CPU 13 will make changes in accordance with the current data inputted as commands by the operator 11 and send the modified information as control signals to the CTLR 29 in order to reposition the mechanical units 18 through 21 as desired. The changes are in the form of "software shim" which reposition the mechanical units through control signals rather than by inserting or removing actual shims.

Figure 3:
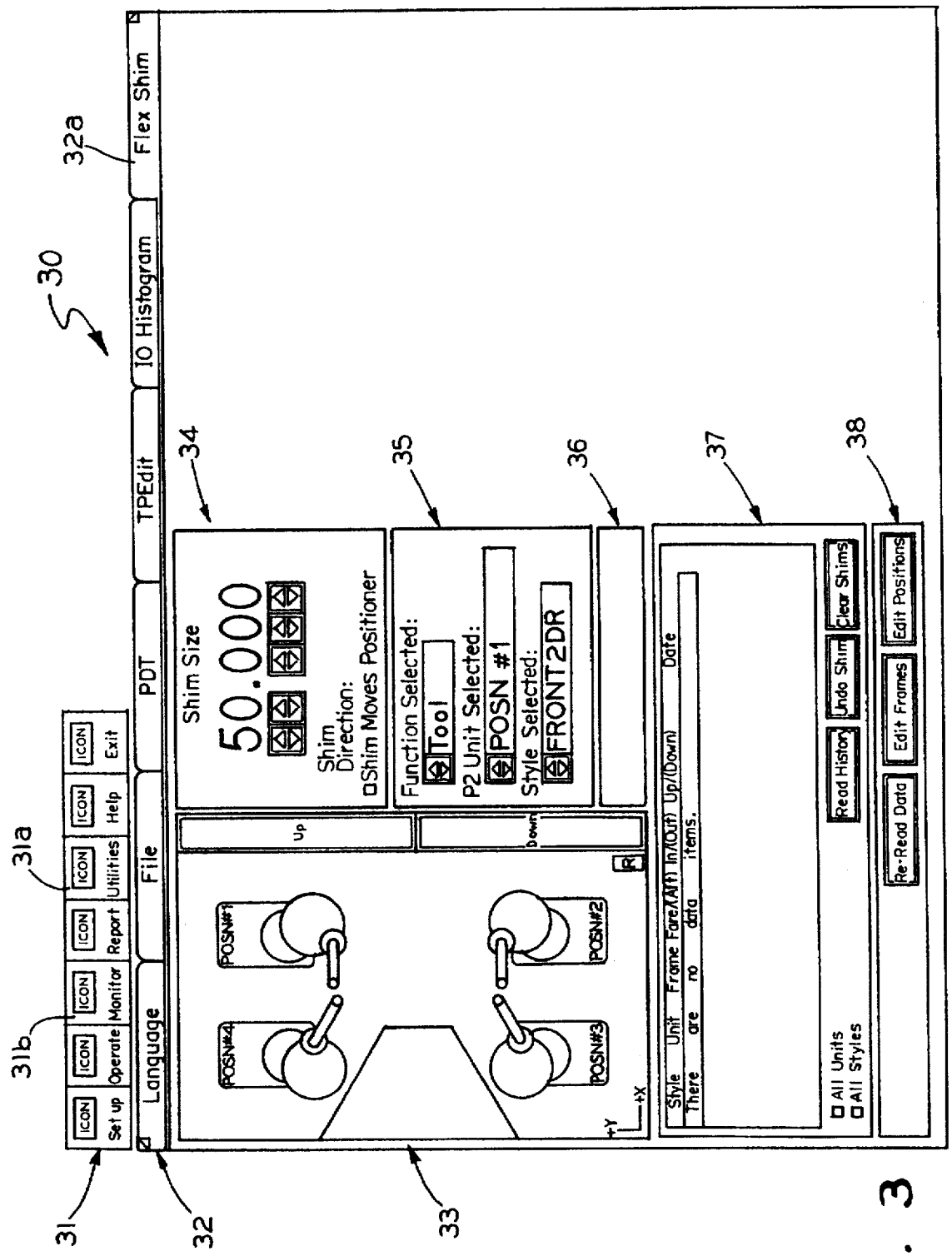
FIG. 3 is a display screen generated on the interface device shown in the FIG. 1.

There is shown in the FIG. 3 a display screen 30 generated by the CPU 13 at the interface 12 for use by the operator 11 to reposition the mechanical units 18 through 21. Extending along an upper side of the display screen 30 is a combination icon bar and title block display area 31. The icons are positioned on software buttons and represent operations which can be performed by the CPU 13 such as Setup, Operate, Monitor, Reports, Utilities, Help and Exit. These operations are selected in a conventional manner by positioning an arrow on the desired icon and clicking a mouse. Located below the bar 31 is a tab bar display area 32 which has software tabs labeled Language, File, PDT, TP Edit, IO Histogram and Flex Shim representing operations which can be performed by the CPU 13. Each of these tabs can be selected by positioning the arrow on the tab and clicking the mouse. As explained below, some operations require the selection of a button and a tab in that order. The screen 30 also includes a manufacturing cell display area 33 located below the tab bar 32 along a left side of the display screen 30. There is generated in the manufacturing cell display area 33 a schematic plan view of the manufacturing cell 14 which is similar to the view shown in the FIG. 2 described above.

Along an upper right side of the manufacturing cell area 33 is located a Shim Size display area 34. Below the Shim Size display area 34 is a Function Selected display area 35 and below the Function Selected display area is a message display area 36. Extending from the left side of the display screen 30 below the manufacturing cell display area 33 and the message display area 36 is a shim history display area 37. Below the shim history display area 37 is an edit display area 38. All of the display areas 31 through 38 will be explained in more detail below.

In operation, the mechanical units 18 through 21 are positioned by the CTLR 29 according to the dimensions of the components being worked upon as referenced from the style origin point 28. Since the drawings for the components include dimensions with tolerances as do the drawings showing the assembly of the components, the actual components mounted on the subplate 16 should fall somewhere within the tolerance ranges on the drawings. If the components being assembled will cause the resultant subassembly to be out of tolerance for the positions of the mechanical units 18 through 21, one or more of the mechanical units must be repositioned. In the prior art manufacturing systems, the repositioning of fixtures and locators was done mechanically by inserting and removing actual shims. The present invention provides a method of creating "software shims" to accomplish the same objectives. The present invention graphically interfaces the operator 11 with the manufacturing cell 14 such that the operator can utilize software shims to position a plurality of servo driven locators, clamps and tools attached to the mechanical units 18 through 21 which locate and fixture automotive components for such operations as spot welding. The present invention has the advantages that multiple mechanical units are integrated in one control system, that all operations of the system can be controlled from a single interface device and that actual shims are not required.

Figure 4:
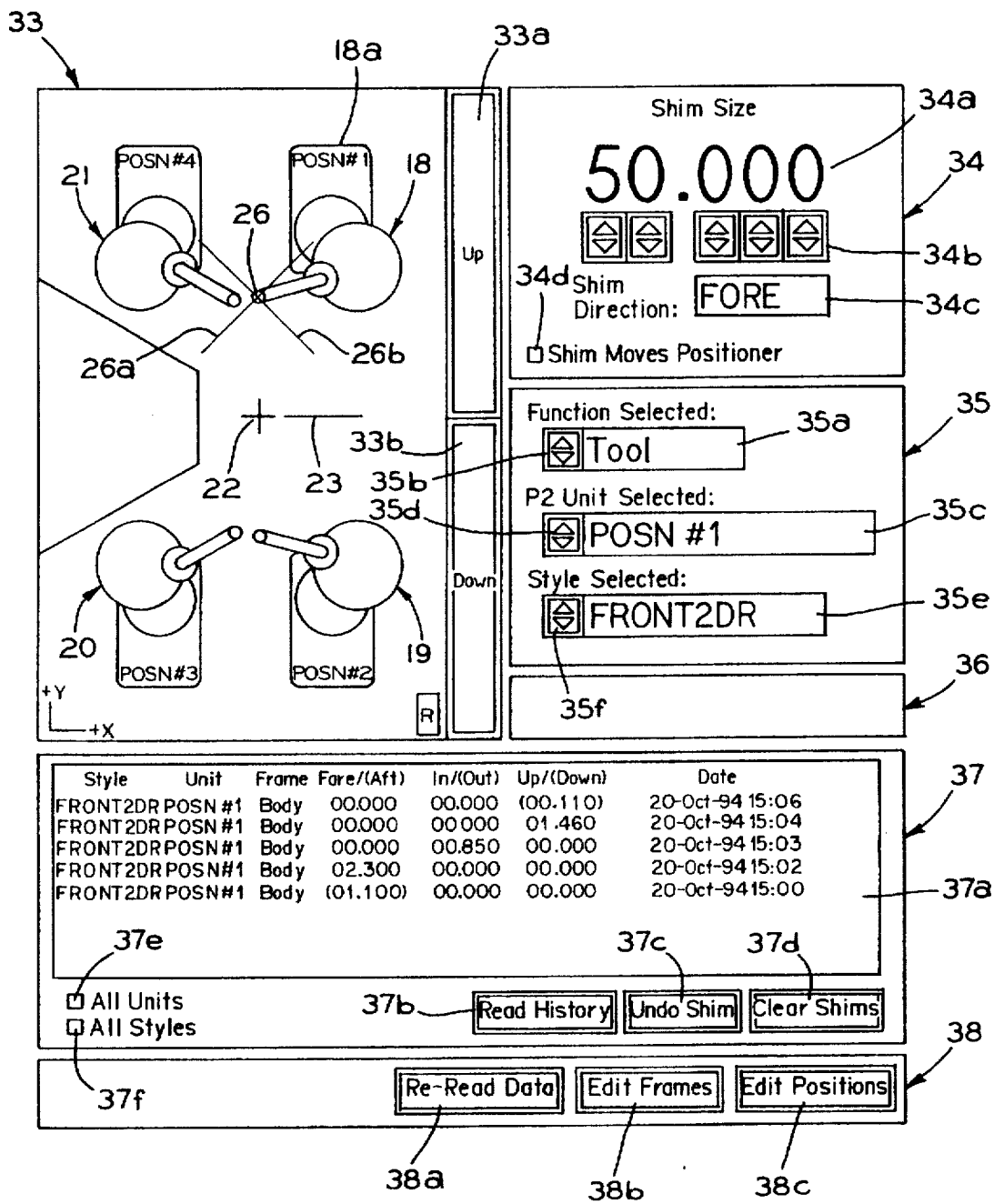
FIG. 4 is a shim utility screen generated on the interface device shown in the FIG. 1.

There is shown in the FIG. 4 a Shim Utility screen which is displayed on the display screen 30 when the operator 11 clicks on a Utilities button 31a and a Flex Shim tab 32a which are shown in the FIG. 3. The CPU 13 will download from the CTLR 29 all the style, arm and positional information for use in positioning the mechanical unit of the manufacturing cell 14. As stated above, the manufacturing cell display area 33 contains a representation of the manufacturing cell 14 including the mechanical units 18 through 21. Each of the mechanical units is identified by a name, such as a name "POSN #1" for the unit 18 shown on a base 18a of the unit. The Shim Size display area 34 will contain information concerning a shim to be applied to the mechanical unit 18. A Shim Size display 34a displays the value of the size or thickness of the shim in millimeters. Each digit of the value displayed can be increased by clicking the mouse on an associated upwardly directed arrowhead or decreased by clicking the mouse on an associated downwardly directed arrowhead on shim size change buttons 34b. The component contact position of the mechanical unit 18 represented by the reference point 26 which is at an intersection of a pair of cross hairs 26a and 26b. The position of the reference point 26 relative to the common reference point 22 can be changed by the value of the shim size by clicking on the areas between the cross hairs with the mouse. The arrow is moved within the space of cross hairs 26a and 26b of the selected mechanical unit and the left button on the mouse is pressed.

If the shim is to be made in the up or down direction along the Z axis 25, then an up button 33a or a down button 33b along a right edge of the display area 33 is clicked on. If the shim is to be made in a direction along the X axis 23 or the Y axis 24, the arrow is moved to the desired quadrant defined by the cross hairs 26a and 26b and the left button on the mouse is pressed. A Shim Direction display 34c shows the direction in which the shim will be applied. The terms "FORE" and "AFT" are utilized to indicate movement to the left and right respectively along the X axis and the words "IN" and "OUT" are utilized to indicate movement down and up respectively along the Y axis. For example, the word "FORE" appears in the display 34c in the FIG. 4 indicating that the shim will be applied in a left hand direction along the X axis 23. A Shim Moves Positioner check box 34d is provided to determine whether the mechanical unit 18 will be moved immediately to the new position or will not move until a command is issued by the operator 11 through the interface 12.

In the Function Selected display area 35, there is a Function Selected display 35a for displaying a visual indication that the "Tool" has been selected and a function change button 35b which permits movement through a menu of functions to be selected. The display area 35 also includes a P2 Unit Selected display 35c indicating that the mechanical unit 18 has been selected as identified by the name "POSN #1". The display 35c is associated with a unit change button 35d for moving through a menu which includes the identifications for the mechanical units 18 through 21. The display area 35 also includes a Style Selected display 35e for indicating a body style selected such as "FRONT 2 DR" and an associated style change button 35f by which the body style is selected from a menu of different body styles.

The message display area 36 shows operating messages indicating what the CPU 13 is doing (e.g., downloading data) or error messages (e.g., a shim makes a position unreachable).

When the function, the mechanical unit and the body style have been selected, the shim history display area 37 includes a shim history display 37a which provides a shim history log as a visual indication of all shims previously generated. A Read History button 37b can be clicked on to cause the CPU 13 to download the stored shim history data from the memory 15 related to the shims for the tool, the mechanical unit and the body style selected. A check box 37e is provided for designating that the shim data for all mechanical units is to be displayed. An All Styles check box 37f is provided for indicating that the shim data for all body styles is to be displayed. The shim data is visually displayed in the shim history display 37a wherein each line reflects data for one shim including the body style, the mechanical unit, the frame, the magnitude of the shim in each of the Cartesian directions and the date and time the shim was made. An Undo Shim button 37c is provided which permits the operator to cancel the most recent shim. A Clear Shims button 37d is provided for deleting all of the displayed shim data.

Below the Shim History display area 37 is the edit display area 38. The area 38 includes a Re-Read data button 38a which can be selected to re-read data from the CTLR 29, an Edit Frames button 38b which can be selected to enter a frame edit utility screen and an Edit Positions button 38c which can be selected to enter a position edit utility screen.

Figure 5:
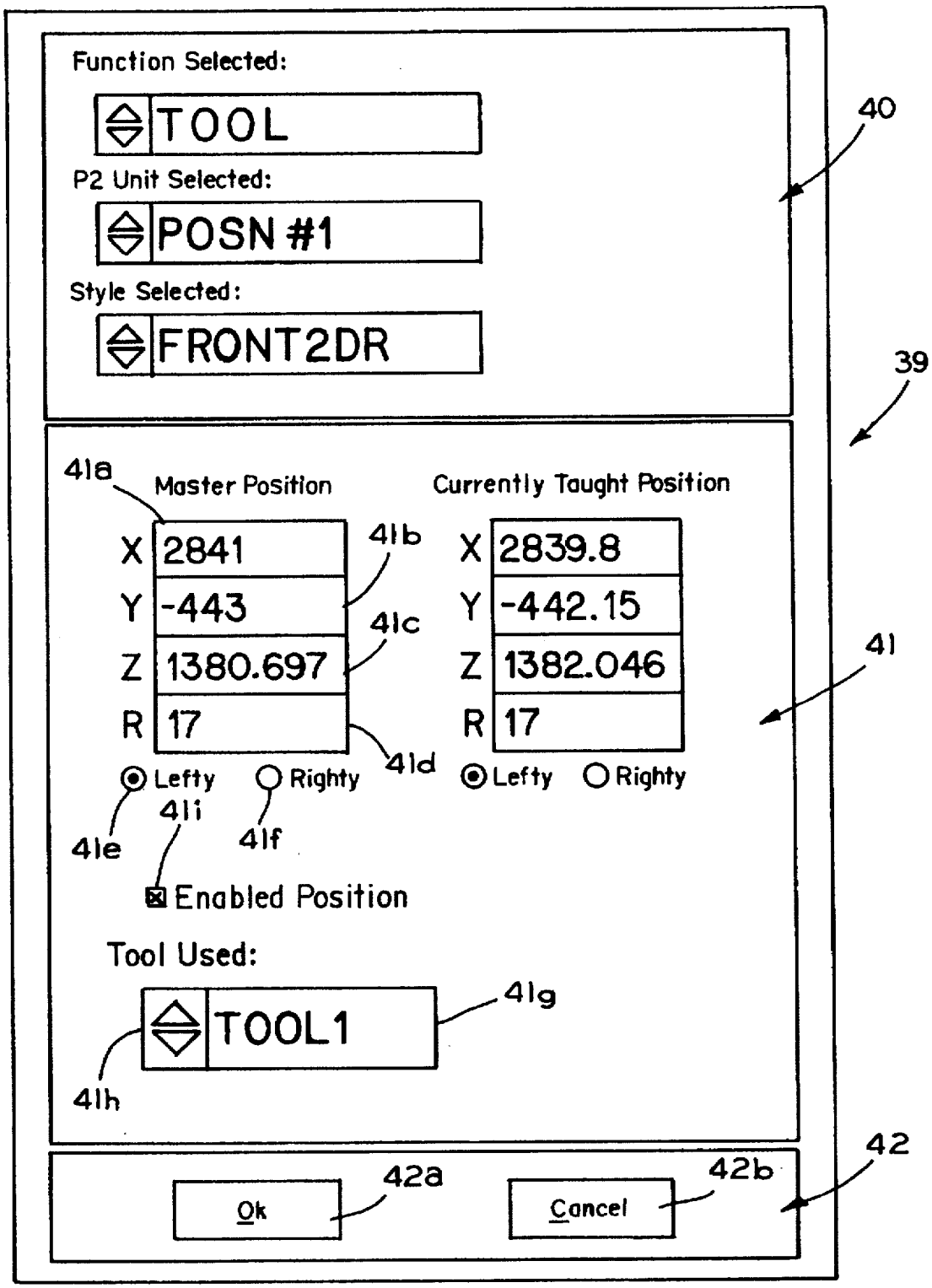
FIG. 5 is a position edit utility screen generated on the interface device shown in the FIG. 1.

If the Edit Positions button 38c is clicked, a position edit utility screen 39 is generated on the interface 12 as shown in the FIG. 5. The screen 39 includes at an upper end thereof a Function Selected display area 40 which is the same as or similar to the display area 35 shown in the FIG. 4. The default information is the same as that which was shown in the display area 35 before leaving the Shim Utility screen. However, the function, unit and style can be changed as was described with respect to the display area 35. Below the Function Selected display area 40 is a Position Display area 41 which indicates "X", "Y", "Z", Roll and configuration data for both the master position and the current position for the selected unit, style and function. The two positions differ in that the master position is never affected by the shims. Therefore, it is possible to return to the original or master position if shimming gets out of hand. The master position data includes an "X" position display 41a, a "Y" position display 41b, a "Z" position display 41c, a "Roll" or "R" position display 41d. The configuration is indicated by a Lefty radio button 41e or a Righty radio button 41f. The values in each of the boxes 41a through 41d can be changed by clicking the mouse on the box and entering a new value. The configuration can be changed by clicking on one of the radio buttons 41e and 41f. A set of similar displays and radio buttons is provided for the currently taught position.

In the lower left corner of the display area 41 is a Tool Used display 41g which indicates the name of the tool to be used by the selected unit when moving to the selected position. The tool is selected by utilizing a tool name change button 41h. An Enabled Position box 41i is provided to indicate whether the selected position of the tool is enabled. If the position is not enabled, the CTLR 29 will ignore this unit when commanded to move to this position. In this case, the "X", "Y", "Z" and "R" values are meaningless.

At the bottom of the screen 39 is a final action display area 42 which includes an OK button 42a and a Cancel button 42b. When the data on the screen 39 is correct, the OK button 42a is clicked or an enter key on an associated keyboard can be pressed. This action will bring up a confirmation box which asks if the changes are to be saved. If the Cancel button 42b is pressed, then the confirmation box will disappear allowing editing to resume.

Figure 6:
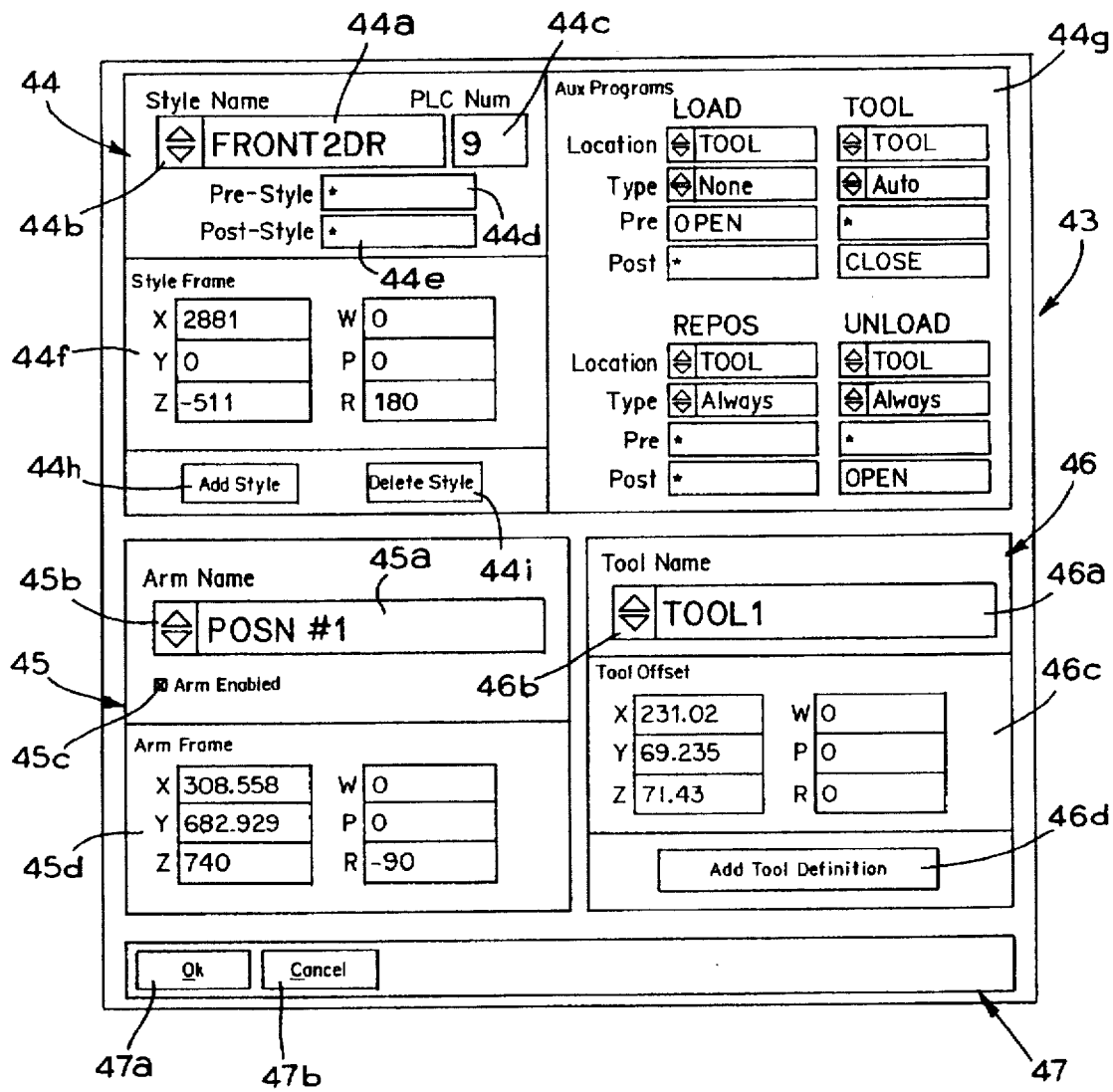
FIG. 6 is a frame edit utility screen generated on the interface device shown in the FIG. 1.

If the Edit Frames button 38b shown on the screen in the FIG. 4 is clicked on, a Frame Edit Utility screen 43 is generated by the interface 12 as shown in the FIG. 6. This screen is divided into three main areas: the Style Frame Edit display area, the Arm Frame Edit display area and the Tool Frame Edit display area. An upper portion of the screen 43 is a Style Frame Edit display area 44. A selected style is indicated in a Style Name display 44a and the selected style can be changed utilizing a style name change button 44b. As the style changes, other associated text displays are updated to reflect the data of the currently selected style. To the right of the Style Name display 44a is a PLC Num display 44c which indicates a reference number for this style which is the value that the CTLR 29 will place on the style input data lines to represent this particular style. The value can be changed by clicking on the display 44c and entering a new number. The display area 44a also includes an upper Pre-Style display 44d and a lower Post-Style display 44e. In these displays there are indicated the names of the auxiliary programs to be executed before and after the style command is executed. To change the name of an auxiliary program, the desired display is clicked on and the new name is entered.

Below the display 44e is a Style Frame display 44f for displaying the frame data for the selected style. The style frame makes the connection from the reference point 22 on the subplate 16 to the style origin point 28 on the part frame. The right side of the Style Frame Edit display area 44 includes an Aux Programs display 44g for indicating data used during the execution of four available commands for each style. The name of the command appears above and the field names appear to the left of the displays. The fields contain the data for the pre- and post-command auxiliary programs to be run, the scope of the motion for that command, and the name of the command for which this commands receives this location data. The names of the Aux Programs are "LOAD", "TOOL", "REPOS", and "UNLOAD". The "Location" and "Type" fields can be changed by clicking on the change buttons to the left of the associated displays.

The command which contains the positional data to be used is stored. For example, if every command tells the mechanical units to go to the same position, that data only needs to be stored under one command (entered in the Position Data Entry screen). Then the location from the fields could all be set to that command name. The typical application would probably store the data under TOOL, for example, and set all the Location fields to TOOL. The motion type for any command has three available choices. A first choice "NONE", causes the mechanical unit not to move at all when that command is selected (this will essentially cause the pre- and post-programs for that command to be executed). An "AUTO" choice will only cause motion when the CTLR 29 is in the auto mode. The "ALWAYS" choice causes motion every time the command is selected for execution. To change an auxiliary program name, click on the desired text box and enter the new name. To clear a name, type an asterisk in the box. An asterisk means that no program is currently selected. Located below the display 44f is an Add Style button 44h and a Delete Style button 44i. When the Add Style button 44h is clicked on, a style for which information has been entered in the screen 43 is added to a list of styles stored in the memory 15 and all data fields are initialized with null data. When the Delete Style button 44i is clicked on, the currently displayed style is deleted. This deletion is not permanent until the screen 43 is exited.

The Arm Frame Edit display area 45 is located below the buttons 44h and 44i and includes an Arm Name display 45a and an arm name change button 45b. The desired mechanical unit to edit is selected by clicking on the change button 45b until the name of the desired mechanical unit is indicated in the display 45a. Below the button 45b is located an Arm Enabled check box 45c which is utilized to enable or disable the arm. With the arm disabled, it will be ignored by the CTLR 29 when the style commands are issued. The arm will remain in the position it was in when it was disabled. Below the check box 45c is an Arm Frame display 45d for indicating the data associated with the selected arm. The arm frame makes the connection from the mechanical unit to the reference point 22 on the subplate 16. The data is changed by clicking on the desired display and typing in new data. To the right of the Arm Frame Edit display area 45 is a Tool Frame Edit display area 46. At the top of the area 46 is a Tool Name display 46a and a tool name change button 46b. The desired tool to edit is selected by clicking on the button 46b. Below the display 46a is a Tool Offset display 46c. The tool frame makes the connection from the faceplate of the mechanical unit to the tool center point of the mounted tool. This data can be changed by clicking on the associated display and typing in new data. At the bottom of the Tool Frame Edit Area 46 is an Add Tool Definition button 46d. When the button 46d is clicked, data in the Tool Frame Edit display area 46 will be added to the memory 15 and the new tool definition will be initialized with no data.

At the bottom of the screen 43 is a final action display area 47 which includes an OK button 47a and a Cancel button 47b. When the data on the screen 43 is correct, the OK button 47a is clicked on or the enter key is pressed. This will bring up a confirmation box which asks is the changes are to be saved (YES), the changes are to be discarded (NO) or just continue editing (CANCEL). If Yes or No is pressed, the CPU 13 will save the changes to the CTLR 29, if necessary, and erase the screen bringing back the Shim Utility screen shown in the FIG. 4. If the Cancel button 47b is clicked, then the confirmation box will disappear, allowing editing to resume.

Figure 7:
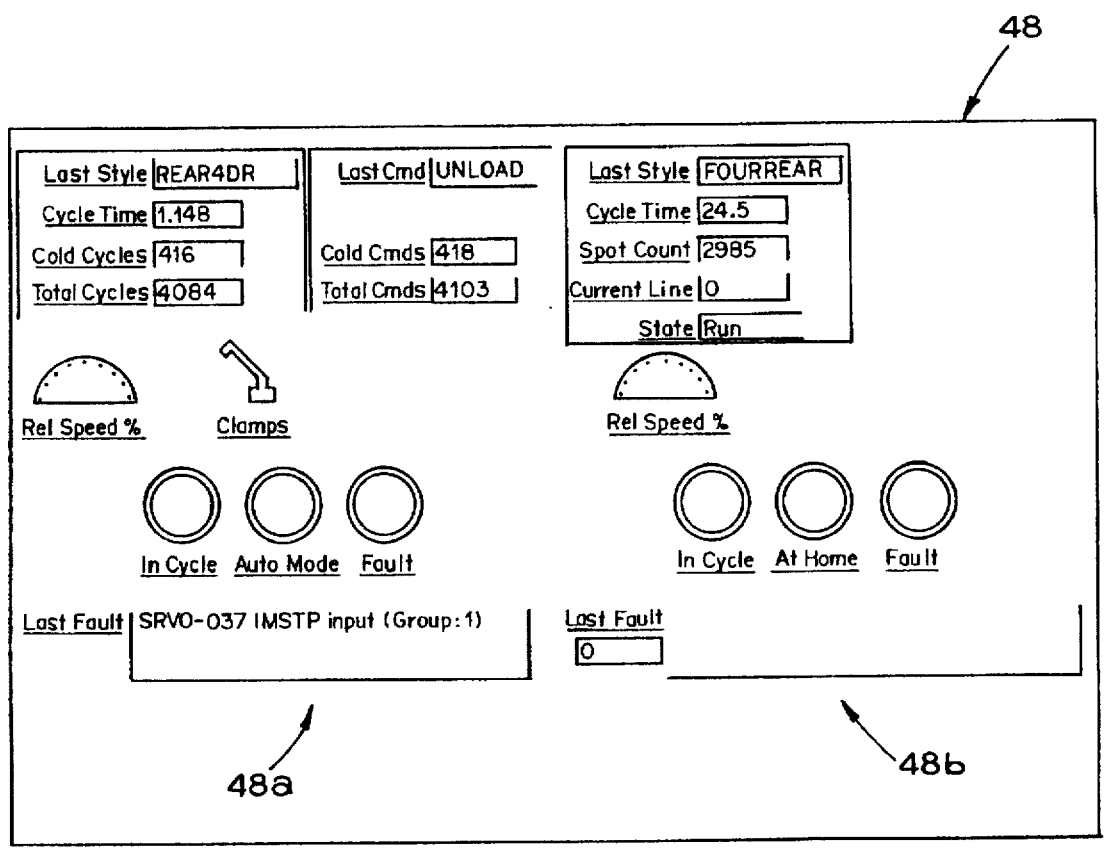
FIG. 7 is a monitor utility screen generated on the interface device shown in the FIG. 1.

There is shown in the FIG. 7 a Monitor Utility screen 48 which is generated by clicking on a monitor button 31b and the Flex Shim tab 32a shown in the FIG. 3. The CPU 13 will read the status of the manufacturing cell 14 from the CTLR 29 and display various information in displays on the screen 48. Information on the status of the CTLR 29 is displayed on the left side of the screen 48 in a positioner display 48a and includes: "Last Style" which is the style which was run last; "Cycle Time" which is the cycle time for the last command; "Last Cmd" which is the last command type run; "Cold Cycles" which is the number of cycles initiated by the CTLR since the last cold start; "Total Cycles" which is the number of cycles since initialization; "Cold Cmds" which is the number of commands initiated by the CTLR, the shim or the interface since the last cold start; "Total Cmds" which is the number of total commands since initialization; "Rel Speed %" which is a graphical representation of TP percent override; "Clamps" which is a graphical representation of the clamps; "In Cycle" light; "Auto Mode" light; "Fault" light; and "Last Fault" which is the last fault message.

At the right side of the screen 48 information is displayed in a manufacturing cell or process equipment (e.g. spot welding robot) display 48b which has been received from and represents the status of the CTLR 29. This information includes: "Last Style" which is the style that was last run; "Cycle Time" which is the cycle time for the last run; "Spot Count" which is the total number of spot counts; "Current Line" which is the line number of the current program; "Rel Speed" which is a graphical representation of TP percent of Override; "In Cycle" light; "At Home" light; "Fault" light; and "Last Fault" which is the last fault message.

Figure 8:
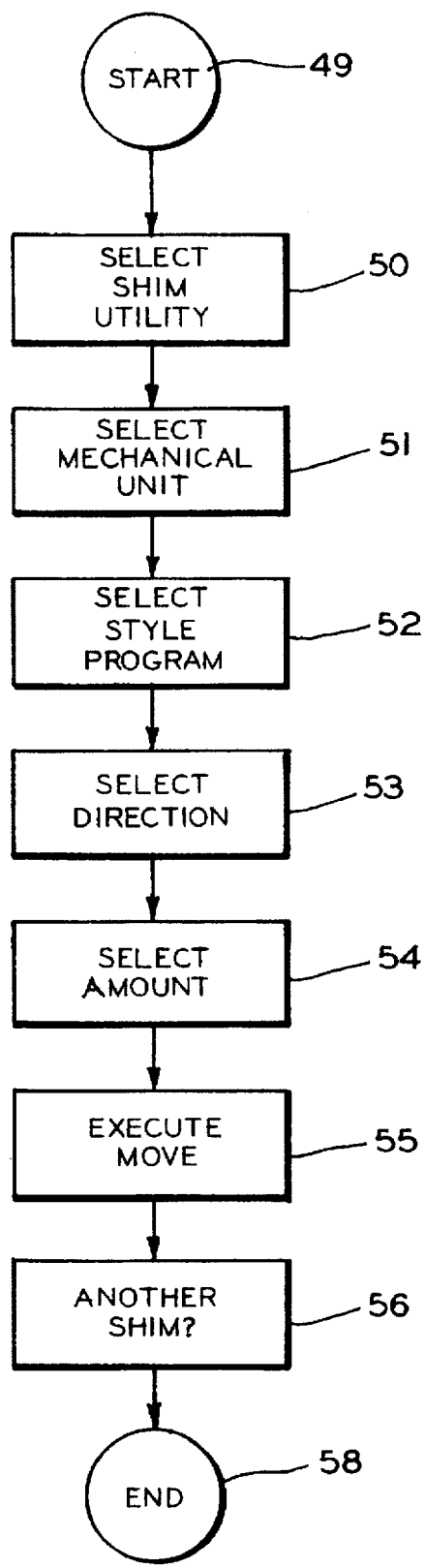
FIG. 8 is a flow diagram of the method of modifying the position of a programmable fixture according to the present invention.

The method implementing a software shim according to the present invention involves the steps of selecting a mechanical unit, selecting a specific style part program, selecting a desired direction of movement, selecting a desired amount of movement in the selected direction and instructing a programmable controller to execute the selected movement. There is shown in the FIG. 8 a flow diagram of the steps for creating a software shim according to the present invention. The method begins at a circle START 49 which causes the screen shown in the FIG. 3 to be displayed by the output means 12b. The input means 12a, in the form of a mouse, is used to perform subsequent steps. The method enters an instruction set 50 SELECT SHIM UTILITY wherein the operator first clicks on the Utilities software button 31a and then on the Flex Shim software button 32a to cause the Shim Utility screen of the FIG. 4 to be displayed. The method enters an instruction set 51 SELECT MECHANICAL UNIT wherein the operator clicks on the change button 35d unit the desired mechanical unit is identified in the display 35c. In the alternative, the operator can click on the representation of the desired mechanical unit in the manufacturing cell display area 33.

After the mechanical unit is selected, the method enters an instruction set 52 SELECT STYLE PROGRAM wherein the operator clicks on the change button 35f until the desired body style part is identified in the display 35e. The method then enters an instruction set 53 SELECT DIRECTION wherein the operator clicks on a desired area between the cross hairs 26a and 26b in the display area 33 to select one of the directions fore, aft, in and out, or clicks on one of the software buttons 33a and 33b to select the up and down directions respectively, the selected direction is indicated in the Shim Direction display 34c. Next, the method enters an instruction set 54 wherein the operator clicks on the shim size change software buttons 34b to select the amount of movement in the selected direction to be caused by the software shim. The operator selected shim size is indicated in the display 34a. The method then enters an instruction set 55 EXECUTE MOVE wherein the CPU 13 sends the move data as control signals to the CTLR 29 automatically if the Shim Moves Positioner check box 34d is enabled.

After all of the data for the software shim has been entered, the program enters an instruction set 56 ANOTHER SHIM? to determine whether another shim is desired. To create another shim, the operator executes the instruction sets 51 through 55. Of course, while the operator is in the Shim Utility screen, he can delete a shim by selecting it in the shim history display 37a and clicking on the Undo Shim software button 37c. After all of the software shims have been created, the method exits at a circle 57.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for modifying a position of a programmable fixture comprising:

a storage means for storing part program master position information representing a master position for a mechanical unit referenced to a predetermined common reference point;

a manufacturing cell having a least one mechanical unit for engaging components to be assembled, said mechanical unit being responsive to a control signal for moving to said master position;

an interface means being responsive to a display signal for generating a visual representation of the master position and being responsive to a human operator for generating a command signal identifying software shim position information for moving said mechanical unit from said master position to a new position, said visual representation being a graphic display of a shim utility screen displaying a plurality of parameters defining said operator selected new position of the programmable fixture relative to a current position of the programmable fixture and including a manufacturing cell display area having a graphical representation of a position of said mechanical unit relative to said predetermined common reference point; and a data processing means connected to said storage means, said mechanical unit and said interface means, said data processing means being responsive to said stored part program master position information for generating said display signal and said control signal, said data processing means being responsive to said command signal for generating a software shim modified control signal, wherein said mechanical unit is responsive to said modified control signal for moving from said master position to said operator selected new position.

2. The apparatus according to claim 1 wherein said shim utility screen includes a function selected display area having a visual indication of a function selected, a mechanical unit selected and a style selected for the programmable fixture.

3. The apparatus according to claim 1 wherein said shim utility screen includes a shim history display area having a visual indication of software shims previously applied to the programmable fixture.

4. The apparatus according to claim 1 wherein said visual indication includes an icon and title bar display area having a graphical representation of icons on software buttons representing operations to be performed by said data processing means.

5. The apparatus according to claim 1 wherein said visual indication includes a tab bar display area having a graphical representation of software tabs representing operations to be performed by said data processing means.

6. The apparatus according to claim 1 wherein said shim utility screen includes a shim size display area having a visual indication of a size of a software shim to be applied to the programmable fixture.

7. The apparatus according to claim 6 wherein said shim size display area has a visual indication of a direction in which the software shim is to be applied to the programmable fixture.

8. An apparatus for modifying a position of a plurality of mechanical units in a manufacturing cell comprising:

a manufacturing cell having a plurality of mechanical units for engaging components to be assembled, each said mechanical unit being responsive to control signals for moving to an associated master position referenced to a common reference point;

a storage means for storing master position information for each of said mechanical units for each of a plurality of styles of components to be assembled;

an interface means being responsive to display signals for generating a visual representation of said master position information and being responsive to a human operator for generating command signals identifying a selected mechanical unit, a selected style of components, and software shim direction and amount information for moving said selected mechanical unit from said associated master position to an associated new position referenced to said common reference point; and a data processing means connected to said storage means, said mechanical units and said interface means, said data processing means being responsive to said stored master position information for generating said display signals and said control signals, said data processing means being responsive to said command signals for generating a software shim modified control signal to said selected mechanical unit, said data processing means storing a set of software shim information in said storage means for each of a plurality of said software modified control signals, said software shim information representing said software shim modified control signal and being associated with said stored master position information for said selected mechanical unit and said selected style of components, whereby said interface means is responsive to said display signals for generating a visual representation of said sets of said software shim information and is responsive to a human operator for generating an undo command signal identifying a selected one of said sets of said software shim information and said data processing means is responsive to said undo command signal for deleting said selected set of said software shim information from said storage means, and said mechanical unit responds to said modified control signal by moving away from said associated master position to said associated new position.

9. The apparatus according to claim 8 including a programmable controller connected between said data processing means and said mechanical units, said programmable controller being responsive to said control signals for moving said mechanical units.

10. A method of creating a software shim to modify a position of a mechanical unit in a manufacturing cell comprising the steps of:

a. generating a graphic display of a master position of at least one mechanical unit in a manufacturing cell, said graphic display being a shim utility screen displaying a plurality of parameters defining an operator selected new position of the mechanical unit relative to a current position of the mechanical unit;

b. inputting into a data processing means a command signal representing a selection of the mechanical unit;

c. inputting into the data processing means a command signal representing a selection of a style program;

d. inputting into the data processing means a command signal representing a selection of desired direction of movement for the selected mechanical unit;

e. inputting into the data processing means a command signal representing a selection of a desired amount of movement in the selected direction; and f. generating from the data processing means a software shim modified control signal for moving the selected mechanical unit from the master position by the selected amount in the selected direction.

11. The method according to claim 10 including a step of storing software shim information representing said software shim modified control signal.

12. The method according to claim 11 including a step of storing master position information representing a master position for each of the mechanical units for each style program software and a step of associating said software shim information with the master position information for the selected mechanical unit.

* * * * *